June 19, 1934. J. M. SHIMER 1,963,685

VALVE

Filed July 24, 1929

INVENTOR
John M. Shimer
By Green & McCallister
His Attorneys

Patented June 19, 1934

1,963,685

UNITED STATES PATENT OFFICE 1,963,685

VALVE

John M. Shimer, Wilkinsburg, Pa., assignor to Wilson-Snyder Manufacturing Corporation, Braddock, Pa., a corporation of Pennsylvania Application July 24, 1929, Serial No. 380,685

17 Claims. (Cl. 251—144)

This invention relates to pumps and more particularly to valves employed in pumps for fluids having a relatively high content of solid materials.

An object of the invention is to provide an improved valve construction applicable to pumps of the type set forth in which a peripheral packing member is mounted on the body of a valve proper, the body and packing member having inclined surfaces cooperating to form a substantially continuous inclined seating surface and in which a clamping member engages the periphery of the packing member.

Another object of the invention is to provide an improved valve structure in which a packing ring is mounted on the periphery of the body of a reversible valve and in which a clamping member is secured to either of opposite sides of the body of the valve.

A further object of the invention is to provide for lateral displacement of elastic resilient ring members employed in valves of the type set forth.

A still further object of the invention is to prevent radial displacement of elastic resilient ring members employed in valves for fluid pumps.

Figure 1:
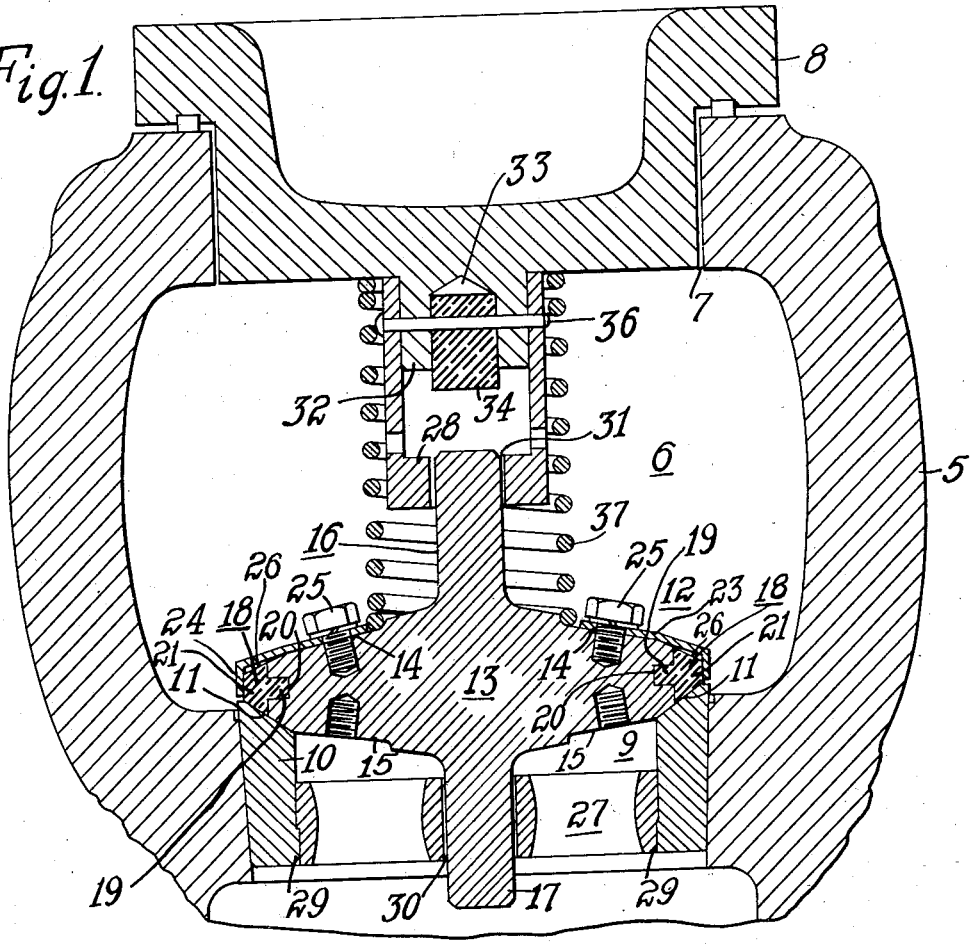
Figure 2:
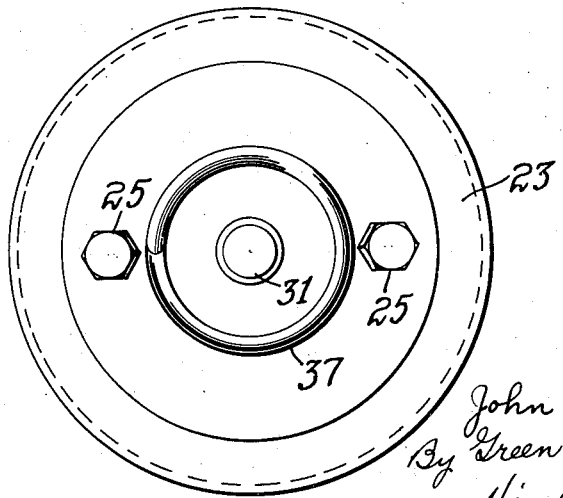

These and other objects of the invention will be apparent to those skilled in the art from the following description taken in conjunction with the accompanying drawing in which;

Figure 1 is a partial view in transverse section of a pump body provided with a valve mechanism constructed in accordance with the invention; and Figure 2 is a top plan view of the improved valve.

Referring to the drawing, the particular embodiment of the invention is shown, for the purpose of illustration, in connection with a pump body 5 having a valve chamber 6 and an opening 7 at the top thereof through which access may be had to the valve chamber and mechanism located therein. The opening 7 may be closed by a cap or cover 8.

The pump body 5 is provided also with an annular opening 9 and an annular valve seat 10 pressed into the opening. The upper end of the seat 10 may be beveled, as indicated, in order to provide a valve seating surface 11 with which a reversible valve assembly, designated generally by the reference character 12, may cooperate to alternately open and close the opening in the valve seat 10 which communicates with the chamber 6 of the pump body.

The valve assembly 12 comprises a body or valve member 13, having symmetrical oppositely disposed faces 14 and 15 in order that the valve may be reversible with respect to the valve seating surface 11. Each of the faces 14 and 15 of the body or valve member 13 may be provided with vertically disposed guide pins 16 and 17. The guide pins, as shown, are preferably integral with the valve member 13 and are so arranged that they extend in opposite directions and in alignment with each other. The periphery of the body or valve member 13 is provided with an annular resilient or elastic ring 18 having a tongue or inwardly extending portion 19 that registers or fits into an annular groove 20 in the periphery of the body or valve member. An outer portion 21 of the ring 18 extends outwardly from the periphery or circumference of the body 13 and is disposed to seat on the valve seating surface 11 when the valve assembly 12 is in the position shown in Fig. 1 of the drawing. Opposite faces of the outwardly extending portion 21 of the ring 18 may be so beveled that the respective faces will substantially coincide with the beveled seating surface 11 of the valve seat 10.

The ring 18 may be made of yielding elastic material such as rubber, a composition of rubber, or of similar substances having yielding elastic characteristics. While particular materials are commented upon, it is to be understood that other materials may be employed which are suitable for the particular application of the valve.

In order that the ring 18 may be held in its proper position, a clamping member 23 is provided and is adapted to be secured to one or the other of the faces 14 and 15 of the body 13. In the particular embodiment illustrated, the clamping member 23 is shown as being secured to the face 14 of the disk. The clamping member 23 may be secured to the valve member 13 by means of cap screws 25.

The clamping member 23 is annular in form and is provided with a depending annular flange 24 that engages a major portion of the surface presented by the periphery of the portion 21 of the ring 18. The flange 24 is adapted to prevent radial expansion or displacement of the ring 18, that may result in practice from repeated hammer blows caused by the seating of the valve upon the seating surface 11.

In order that lateral expansion or displacement (as distinguished from radial displacement) of the portion 21 of the ring 18 may take place, an annular clearance space is provided between the member 23 and the ring 18 as indicated at 26. If the ring 18, after blows caused by the continued intermittent seating of the valve "grows" or expands in a lateral direction, the expansion will be in such a direction as to either partially or completely fill the annular clearance space indicated at 26. Since the ring 18 may be displaced laterally into the clearance space, that portion of the ring disposed to engage the seating surface 11 will remain true and symmetrical in shape until so worn that it no longer will function efficiently.

In order that the body or valve member 13 may be guided in its movement as it is alternately lifted from and seated upon the seating surface 11 of the valve seat 10, guiding members 27 and 28 are provided. The guiding member 27 may be pressed into the seat 10 (see Figure 1 of the drawing). The valve seat 10 is provided with an annular shoulder or ledge 29 that acts as a stop for the guiding member 27 when it has been pressed into its proper position. The guiding member 27 may be provided with a cross bar or member having an opening 30 in which the guide pin 17 may move in a direction normal to the valve seating surface 11.

The guiding member 28 may be cylindrical in form and provided with an opening 31 in which the pin 16 may move. The guide member 28 may be secured to a boss 32 forming a part of the cover 8 and extending into the chamber 6 of the housing 5. The boss 32 is provided with a well or tapped hole 33 into which an elastic bumper 34 may be placed, the bumper 34 being disposed to absorb the force of impact resulting from the stem 16 striking against the bumper 34 when the valve is opened. The guide 28 and the bumper 34 may be secured in place with respect to the boss 32 by a pin 36.

Since the bumper 34 is of resilient or elastic material the end of the guide pin 16 will not become "mushroomed" or enlarged; therefore, when the valve is reversed, the pin 16 will pass through the opening 30 in the guide 27. The guide pins 16 and 17 of the disk 13 are of substantially equal length in order that the valve will lift a specified or predetermined amount, irrespective of which pin 16 or 17 extends through the opening 30 in the guide 27.

In pumps employing valves of the character indicated generally by reference numeral 12, the valve is automatically opened and closed in response to the alternating differential pressure on the opposite faces 14 and 15 caused by movement of the piston or plunger of the pump as will be readily understood by those skilled in this particular art. For example, if the pump is delivering fluid through the valve seat 10 of the valve, the pressure of the fluid will cause the valve to lift or unseat from the seating surface 11. When the pressure in the fluid drops, the valve is reseated by means of a spring 37 which spring is disposed between the cover 8 and the face 14 of the disk 13. If the face of the ring 18 which engages the seating surface 11 of the valve seat 10 should become worn in service, the cover member 8 may be removed so that the member 13 may be reversed. Before the valve member 13 is reversed, however, the clamping member 23 is removed and mounted on or secured to the face 15 thereof. The unworn face of the ring 18 may then be utilized until it is so worn that the ring is no longer fluid tight when seated upon the seating surface 11. When both of the seat engaging faces of the ring 18 are so worn that they are no longer efficient, a new ring 18 may be substituted for the worn ring and the valve will operate efficiently until both faces thereof are no longer adapted to render the valve fluid tight when seated.

By providing a valve which is reversible, it will be apparent that not only is the life of the valve doubled, but the symmetrical construction provides a valve member which can be readily forged from a single piece of material, thereby eliminating the necessity of a built-up or assembled structure with the resulting wear between the several parts.

While only one form of the invention has been shown and described, it is to be understood that various modifications and changes may be made in the device constructed in accordance with the invention without departing from the spirit and scope of the invention. It is desired, therefore, that only such limitations shall be placed on the invention as are imposed by the prior art and the appended claims and that the specific embodiment of the invention shown and described is to be taken as being merely illustrative of the invention and not as a limitation.

What I claim as new and desire to secure by Letters Patent is:

1. In a valve for a chamber having a valve seat, in combination, a valve member having symmetrical oppositely disposed faces, a resilient member mounted on the periphery of the valve member and adapted to engage said valve seat, an annular member having a depending flange for engaging the periphery of said resilient member for clamping the latter in place, and connecting means arranged to attach the annular member to either of opposite sides of the valve member in position to thus engage the resilient member.

2. In a valve for a chamber having an annular valve seat, in combination, a valve body having an annular groove in the perphery thereof, the opposite faces of said valve body being symmetrical in form with respect to the periphery thereof, a resilient elastic ring having an inner portion located in said groove and an outer portion extending from the periphery of said valve body, the faces of said ring adjacent the faces of said valve body being symmetrical, and a clamping ring secured to one face of said valve body and having a depending flange engaging a portion of the peripheral surface of said ring, said clamping ring being adapted to be secured to either face of said valve body.

3. A valve comprising a valve body, an elastic ring mounted on the periphery of the valve body, a clamping ring having a depending annular flange engaging the periphery of the ring to clamp the same in position, and connecting means arranged to attach the clamping ring to either of opposite sides of the valve body selectively.

4. A valve including a body and packing carried thereby, the body being formed on each of opposite sides thereof with an inclined seating surface and the packing being formed with an inclined seating surface adapted to cooperate with the inclined seating surface of the body to form a substantially continuous tapering seating surface for the valve, a clamping member for engaging the packing to clamp the same in the position on the body, and connecting means arranged to attach the clamping member to either of said opposite sides of the body.

5. A valve comprising a valve body, an elastic ring mounted on and overlying the periphery of the valve body, said body and ring having inclined surfaces cooperating to form a substantially continuous inclined seating surface, and a clamping member engaging the periphery of the resilient ring and removably secured to the valve body, said member providing a space for lateral crowding of the ring.

6. A valve comprising a valve body having a groove in the periphery thereof, an annular resilient ring having a portion located in said groove and a portion extending outwardly from the periphery of the valve body, a clamping member having a depending annular flange engaging the periphery of the outwardly extending portion of the ring, and means for selectively holding the clamping member to either of opposite sides of the valve body in position to thus engage the ring.

7. In a valve for a chamber having a valve seat, in combination, a valve member provided with a groove in the periphery thereof and having symmetrical oppositely disposed faces, a resilient member disposed in said groove adapted to engage said valve seat, a clamping member having a depending flange for engaging the periphery of said resilient member for holding it in said groove, and means for selectively holding the clamping member to either of opposite sides of the valve member in position to thus engage the ring.

8. A reversible valve comprising in combination a valve body having a seating surface on each of opposite sides thereof, packing carried by the valve body adjacent the seating surfaces and cooperating therewith to provide a fluid tight closure when either seating surface of the body is in engagement with its valve seat, a clamping member adapted to selectively engage either of said opposite sides of the body and over-lie at least a portion of the packing to clamp the same in operative position, and means for holding said clamping member against either side of the body selectively.

9. In combination, an integral disc valve, an elastic packing ring mounted on and overlying the periphery of the integral disc valve, said elastic member having a portion projecting inwardly into a depression in the periphery of the integral disc valve and being symmetrical to the plane of said projecting portion whereby it may be reversed to bring either side into the plane of a face of said valve, and a clamping member removably secured to the integral disc valve and engaging the periphery of the packing member to prevent displacement of said projecting portion from said depression.

10. In combination, a disc valve having a peripheral groove, a packing ring encircling the periphery of said valve and having a tongue engaging in said groove, said ring being of elastic material and assembled with the disc valve by elongation whereby it may move over the periphery of the disc valve and the tongue be received in the groove and being symmetrical to the plane of said projecting portion whereby it may be reversed on said valve to bring either of its sides into the plane of a face of said valve, and a clamping member engaging the periphery of said packing ring to prevent displacement of the tongue from said groove.

11. In combination, a valve having an annular groove in the periphery thereof, an elastic ring disposed about and overlying the periphery of the valve, said ring having an inwardly projecting tongue and being assembled with the valve by elongation whereby the ring may move over the periphery of the valve and the tongue be received in the groove and being symmetrical to the plane of said projecting portion whereby it may be reversed on said valve to bring either of its sides into the plane of a face of said valve, and a clamping member secured to the valve, said clamping member having an annular flange engaging the periphery of the elastic ring to prevent displacement of the tongue from said groove.

12. A valve having a groove in the periphery thereof, a packing ring overlying the periphery of said valve to one edge thereof and having an inwardly projecting portion, said ring being of elastic material and assembled with the valve by elongation whereby the ring may move over the periphery of the valve and the projecting portion be received in the groove and being symmetrical to the plane of said projecting portion whereby it may be reversed on said valve to bring either of its sides into the plane of a face of said valve, and a clamping member engaging the periphery of the packing ring for opposing radial expansion or displacement thereof.

13. A valve having a groove in the periphery thereof, a packing ring overlying the periphery of said valve to one edge thereof and having an inwardly projecting portion, said ring being of elastic material and assembled with the valve by elongation whereby the ring may move over the periphery of the valve and the projecting portion be received in the groove and being symmetrical to the plane of said projecting portion whereby it may be reversed on said valve to bring either of its sides into the plane of a face of said valve, and means on said valve preventing radial expansion of said ring while permitting lateral expansion thereof.

14. In a valve mechanism of the type having adjacent the valve chamber an outwardly upwardly inclined valve seat, a valve member provided with a seating surface radially within its periphery for engaging the valve seat, said valve member having a depression in the periphery of an integral portion thereof, an elastic member mounted on and overlying the periphery of the valve member, said elastic member having a portion projecting inwardly into said depression on the integral portion of the valve member and being symmetrical on the plane of said projecting portion whereby it may be reversed to bring either of its sides into the plane of said seating surface, and a clamping member secured to the valve member, said clamping member having a depending annular flange engaging the periphery of the resilient member.

15. Valve mechanism comprising a valve seat having an outwardly upwardly inclined seating surface, a valve body having a depression in the periphery of an integral portion thereof, a packing ring mounted on and overlying the periphery of the body and being symmetrical on a plane of said projecting portion whereby it may be reversed to bring either side into the plane of the seating surface of said valve body, and having a portion projecting into said depression in the integral portion of the valve body, said body and ring having a substantially continuous seating surface partly on the body and partly on the ring, and a clamping member secured to the body and having a flange overlying at least a portion of the periphery of the packing ring.

16. A valve comprising a valve body having a depression in the periphery of an integral portion thereof, a packing ring mounted on and overlying the periphery of the body and having a portion projecting inwardly into said depression in the integral portion of the valve body and being symmetrical on a plane of said projecting portion whereby it may be reversed to bring either side into the plane of the seating surface of said valve body, said body and ring having a substantially continuous inclined seating surface partly on the body and partly on the ring beyond said periphery, and a clamping member secured to the body and having a flange overlying at least a portion of the periphery of the packing ring.

17. A valve comprising a body formed with an outwardly upwardly inclined seating surface, a peripheral surface encircling said seating surface and having an annular groove therein, a peripheral packing member having a tongue projecting inwardly into said groove and overlying said peripheral surface and having a seating surface forming substantially a continuation of the inclined seating surface of the body, said peripheral packing member being symmetrical to the plane of said tongue whereby it may be reversed to bring either face into the plane of said inclined seating surface of said body, and a clamping member having a depending annular flange engaging the periphery of the packing member to clamp the same in position.

JOHN M. SHIMER.